(12) United States Patent
Iwamoto et al.

(10) Patent No.: US 12,506,675 B2
(45) Date of Patent: Dec. 23, 2025

(54) CONTROL SYSTEM, NETWORK CONTROL METHOD AND PROGRAM

(71) Applicant: NTT, Inc., Tokyo (JP)

(72) Inventors: Masayoshi Iwamoto, Tokyo (JP); Akito Suzuki, Tokyo (JP); Masahiro Kobayashi, Tokyo (JP)

(73) Assignee: NTT, Inc., Tokyo (JP)

(*) Notice: Subject to any disclaimer, the term of this patent is extended or adjusted under 35 U.S.C. 154(b) by 3 days.

(21) Appl. No.: 18/567,017

(22) PCT Filed: Jun. 15, 2021

(86) PCT No.: PCT/JP2021/022738
§ 371 (c)(1),
(2) Date: Dec. 4, 2023

(87) PCT Pub. No.: WO2022/264284
PCT Pub. Date: Dec. 22, 2022

(65) Prior Publication Data
US 2024/0283727 A1 Aug. 22, 2024

(51) Int. Cl.
H04W 28/02 (2009.01)
H04L 43/0852 (2022.01)
H04L 43/20 (2022.01)
H04L 47/2483 (2022.01)
H04N 5/445 (2011.01)
G06F 15/16 (2006.01)

(52) U.S. Cl.
CPC .......... *H04L 43/20* (2022.05); *H04L 43/0858* (2013.01); *H04L 47/2483* (2013.01)

(58) Field of Classification Search
CPC . H04L 43/20; H04L 43/0858; H04L 47/2483; H04L 24/10; H04W 28/02; H04N 5/445; G06F 15/16
USPC ........................................................ 709/238
See application file for complete search history.

(56) References Cited

U.S. PATENT DOCUMENTS

2012/0072267 A1* 3/2012 Gutierrez, Jr. ... G06Q 10/06393
705/7.11
2017/0093658 A1 3/2017 Ryan et al.
2017/0180050 A1* 6/2017 Littlewood ......... H04J 14/0227
(Continued)

OTHER PUBLICATIONS

Halpern et al., "Service function chaining (SFC) architecture", Technical report, IETF, Oct. 2015.
(Continued)

*Primary Examiner* — Jude Jean Gilles

(57) ABSTRACT

In a control system for controlling a network providing a service by using a virtual network function, the control system includes: a QoS estimation unit configured to estimate QoS at a current time of each flow in the network on a basis of observation information of the network; a QoS degradation detection unit configured to determine whether or not there QoS degradation flow is present on a basis of an estimation result by the QoS estimation unit; and a control determination unit configured to determine a control content and an execution timing thereof by solving an optimization problem with minimizing a total of degradation amounts in a time range from the current time to future for all flows as an objective function when the QoS degradation flow is determined to be present by the QoS degradation detection unit.

10 Claims, 5 Drawing Sheets

(56) References Cited

U.S. PATENT DOCUMENTS

2018/0152958 A1 5/2018 Arnold et al.
2020/0280871 A1* 9/2020 Khirallah .......... H04W 28/0257

OTHER PUBLICATIONS

He et al., "Modeling flow setup time for controller placement in SDN: Evaluation for dynamic flows", 2017 IEEE International Conference on Communications (ICC), pp. 1-7, 2017.
Sairam et al., "Netra: enhancing IoT security using NFV-based edge traffic analysis", IEEE Sens. J., vol. 19, No. 12, pp. 4660-4671, Jun. 15, 2019.
Iwamoto et al., "Virtual network function scheduling for minimizing a duration of QoS degradation", Proceeding of the IEICE general conference 2, p. 121, Mar. 9-12, 2021.
Office Action issued in related application JP 2023-528821, Aug. 27, 2024, 6 pages.
Yousefi et al., "Workload Scheduling on heterogeneous Mobile Edge Cloud in 5G networks to Minimize SLA Violation," arXiv preprint arXiv:2003, 02820v2, Mar. 2020, pp. 1-12.
Office Action mailed on Jan. 21, 2025 issued with respect to corresponding Japanese Patent Application No. 2023-528821, 6 pages with English Translation.

* cited by examiner

CONTROL SYSTEM, NETWORK CONTROL METHOD AND PROGRAM

CROSS-REFERENCE TO RELATED APPLICATIONS

This application is a U.S. 371 Application of International Patent Application No. PCT/JP2021/022738, filed on 15 Jun. 2021, the disclosure of which is hereby incorporated herein by reference in its entirety.

TECHNICAL FIELD

The present invention relates to a control system for a virtual network function using a network virtualization technique.

BACKGROUND ART

In network virtualization techniques, a virtual network function (SF: Service Function) is executed as an instance (SFI: Service Function Instance) on a server. Services using network virtualization are constituted by a plurality of pieces of SF processing, and SF processing order is defined by SFC (Service Function Chain).

As a concrete example of the service, a network security service, a video distribution service, and the like are assumed. In the case of the network security service, SF corresponds to IDS, load balancer, firewall and the like. In the case of the video distribution service, SF corresponds to a video encoder, DPI, other additional services, etc.

Virtual network control routes traffic to an SFI in accordance with an SFC of a service, and each SFI executes processing of an SF constituent of the service, with respect to the traffic. The virtual network control is mainly divided into "resource control" and "routing control" of the virtual network function (NPL 1).

The resource control performs new generation, deletion, and resource amount (CPU, memory, etc.) change of the SFI. The routing control determines the SFI to be used for each service and controls a route through which traffic flows. Generally, an executable timing and a time required (control execution time) from a start to completion of the execution are different depending on a type of control.

With respect to the executable timing, for example, when newly generating an SFI and performing load distribution of traffic to the SFI, execution of the new generation of the SFI by the resource control must be completed prior to a start of the execution of switching traffic route by the routing control. In addition, for the control execution time, approximately several seconds are required to switch the traffic route by routing control (NPL 2), and approximately 10 minutes are required for changing a resource amount of SFI by resource control (NPL 3).

The virtual network control is aimed at resource allocation and routing to minimize QoS degradation for time-varying traffic demands. Further, since the executable timing and the execution time are different for each control, optimal control scheduling considering such differences is required to minimize QoS degradation (NPL 4).

CITATION LIST

Non-Patent Literature

NPL 1: J. Halpern and C. Pignataro, "Service function chaining (SFC) architecture", Technical report, IETF, 2015.

NPL 2: M. He, A. Basta, A. Blenk, and W. Kellerer, "Modeling flow setup time for controller placement in SDN: Evaluation for dynamic flows", 2017 IEEE International Conference on Communications (ICC), pp. 1-7, 2017.

NPL 3: R. Sairam, et al., "NETRA: enhancing IoT security using NFV-based edge traffic analysis", IEEE Sens. J., vol. 19, no. 12, pp. 4660-4671, 2019.

NPL 4: Masayoshi Iwamoto, Akito Suzuki, Masahiro Kobayashi, Shigeaki Harada, "Virtual network function scheduling for minimizing a duration of QoS degradation", Proceeding of the IEICE general conference 2, p. 121, March 2021.

SUMMARY OF INVENTION

Technical Problem

Existing methods of virtual network control include, for example, methods that are directed to minimizing QoS degradation. For example, there is an existing method for scheduling optimal control for moving a virtual machine between physical machines. However, the existing method is not intended for a virtual network in which control having different execution times coexist, and cannot be applied to the problems described in the background art.

NPL 4 discloses an existing method for performing resource/routing control for the purpose of minimizing the duration of QoS degradation (QoS degradation time). In the technique disclosed in NPL 4, a combination of a service and an area of a terminal using the service is called a flow, and QoS is monitored in units of flow. Then, control for minimizing the QoS degradation time of the flow in which the QoS degradation occurs is sequentially calculated in units of flow. However, when QoS degradation of a plurality of flows occurs simultaneously, control of a part of the flows is postponed, and there is a problem that the QoS degradation of the flow is prolonged.

The present invention has been made in view of the foregoing, and an object of the present invention is to provide a technique for performing control so as to minimize QoS degradation time for all flows in control of a network that provides services using a virtual network function.

Solution to Problem

According to the technique disclosed herein, a control system for controlling a network that provides a service by using a virtual network function is provided, the control system including:
 a QoS estimation unit configured to estimate QoS at a current time of each flow in the network on a basis of observation information of the network;
 a QoS degradation detection unit configured to determine whether or not a QoS degradation flow is present on a basis of an estimation result by the QoS estimation unit; and
 a control determination unit configured to determine a control content and an execution timing thereof by solving an optimization problem with minimizing a total of degradation amounts in a time range from the current time to future for all flows as an objective function when the QoS degradation flow is determined to be present by the QoS degradation detection unit.

Advantageous Effects of Invention

According to the disclosed technique, in a control of a network providing a service by using a virtual network function, control can be realized in which QoS degradation time is minimized for all flows.

DESCRIPTION OF EMBODIMENTS

Figure 1:
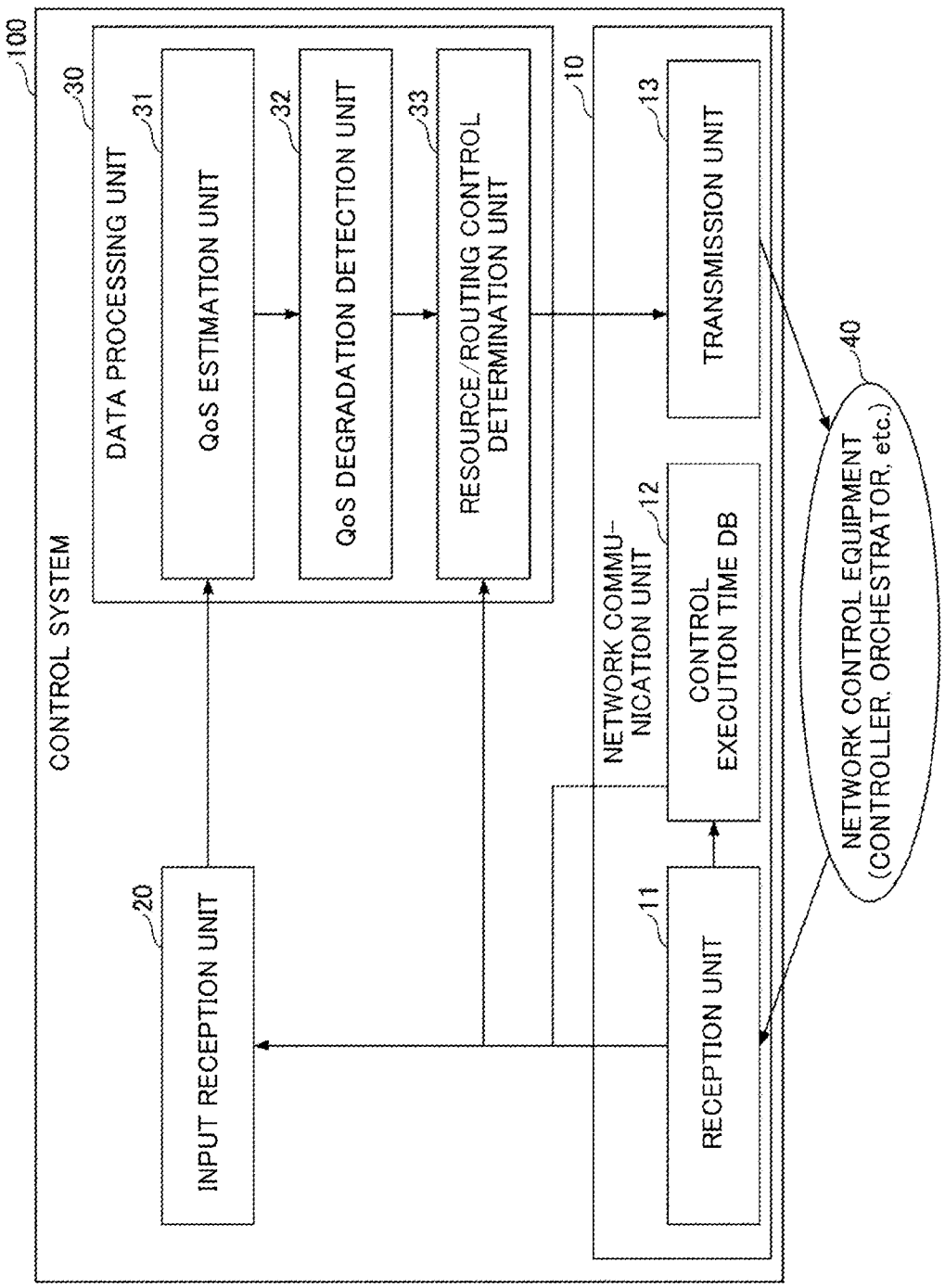
FIG. 1 is a configuration diagram of a control system according to an embodiment of the present invention.

An embodiment (present embodiment) of the present invention will be described below with reference to the drawings. The embodiment to be described below is simply an example, and embodiments to which the present invention is applicable are not limited to the following embodiment.

Overview of Embodiment

In the present embodiment, a control system of a virtual network function using a network virtualization technique is targeted, and QoS degradation in each flow is detected based on periodic observation information of a network. Then, when QoS degradation of the flow is detected, control for suppressing the QoS degradation is performed. At this time, unlike sequential control for each flow such as an existing method, an optimal control content and control execution timing over the future are calculated on the basis of mathematical optimization. Thus, control is performed so that the QoS degradation time is minimized for all flows. Specifically, the optimization problem is as follows.

For example, consider a case in which QoS degradation occurs in certain flows a and b, and the degree of QoS degradation in flow a is greater than that in flow b. Assume also that it is effective to distribute traffic load to an SFIc or an SFId to improve the QoS in flow a, and that it is effective to distribute traffic load to SFIc to improve the QoS in flow b. In the existing method, control is sequentially executed from the flow having the greater degree of QoS degradation.

Therefore, in a control based on the existing method, control for minimizing the QoS degradation time is given priority to the flow a having the large QoS degradation. That is, there is a possibility that traffic load distribution to the SFIc is executed for the flow a. In this case, effective control cannot be executed for the flow b, and the QoS degradation time of the flow b is prolonged.

On the other hand, in the control according to the present embodiment, control is performed such that the QoS degradation time is minimized in all flows, including flows a and b. Therefore, the traffic load distribution is executed to the SFId for the flow a and to the SFIc for the flow b, and the QoS degradation time of both flows can be suppressed.

In addition, in order to perform scheduling of resource/routing control, it is necessary to complete calculation of control in a range of several seconds to several minutes. On the other hand, in the calculation of the control to be described later, the calculation time required for the calculation of the control increases in accordance with the scale (the number of nodes and the number of services) of the network to be controlled. In this case, the control system according to this embodiment assumes a relatively small-scale network of 10 to 100 nodes and 5 to 10 services as a control object, and the calculation of control can be performed by a general-purpose computer in several seconds to several minutes. Further, if solution can be calculated within a practical time, the technique according to the present embodiment can be applied to a larger-scale network.

Hereinafter, the configuration and operation of the control system according to the present embodiment will be described in detail.

System Configuration

FIG. 1 shows a configuration example of the control system 100 according to the present embodiment. As shown in FIG. 1, the control system 100 includes a network communication unit 10, an input reception unit 20, and a data processing unit 30. A network control equipment 40 is connected to the control system 100.

The network communication unit 10 includes a reception unit 11, a control execution time DB 12, and a transmission unit 13. The data processing unit 30 includes a QoS estimation unit 31, a QoS degradation detection unit 32, and a resource/routing control determination unit 33 (hereinafter referred to as a control determination unit 33). Note that the data processing unit 30 may be called "control system 100".

The network control equipment 40 is a controller or an orchestrator. A network to be controlled by the network control equipment 40 (a network to be controlled by the control system) is, for example, a core network accommodating a plurality of wireless base stations. A terminal exists in a cell under each wireless base station, and a service provided by a network is utilized. However, the foregoing premise is exemplary.

The function of each unit will be described below.

<Reception Unit 11>

The reception unit 11 periodically receives, from the network control equipment 40 such as the controller/orchestrator of the virtual network, "physical network information", "virtual network information", "network observation information", and "information related to network control", and transmits the received information to the input reception unit 20 periodically in the same manner. Contents of each information are as follows.

"Physical network information" includes the following information.

Information indicating a server in a network and performance of the server (a CPU capacity, a memory capacity, and the like)

Information indicating a link in the network and information thereof (a bandwidth or a propagation delay of the link)

Network topology information (connection relationship between servers and the like)

"Virtual network information" includes the following information.

Information indicating a type of virtual network function (SF)

Information of flows utilizing the network

Information indicating SF used by the flow and its order (SFC)

Information indicating QoS requirements for each service (allowable maximum delay time (s))

"Network observation information" includes the following information.

Information indicating a traffic load (traffic arrival rate (MB/s)) per server

Information indicating a traffic load (traffic arrival rate (MB/s)) per SFI

Information indicating a traffic load (traffic arrival rate (MB/s)) per flow

"Information related to network control" includes the following information.

Information indicating control execution time (s) related to a resource allocation of SFI Information indicating control execution time (s) of routing Specifically, the control execution time (s) related to the resource allocation of the SFI is the time required for the resource allocation change (when the resource allocation is reduced, when the resource allocation is increased), and the time required for the start-up of the new SFI.

Specifically, the control execution time (s) of the routing is the time required for routing change of traffic (such as changing a server responsible for processing flow).

Note that each control execution time of "Information related to network control" has been measured in advance or can be estimated. Also, "information on network control" is stored in the control execution time DB 12 of the network communication unit 10, and read from the control execution time DB 12 as necessary.

<Input Reception Unit 20>

The input reception unit 20 periodically receives information from the reception unit 11 of the network communication unit 10 and transfers the received information to the data processing unit 30. The input reception unit 20 may extract information to be given to the data processing unit 30, such as format change or rounding of a value of the received information.

<QoS Estimation Unit 31>

The QoS estimation unit 31 estimates the current QoS for all flows on the basis of information from the input reception unit 20 to transmit an estimation result to the QoS degradation detection unit 32.

<QoS Degradation Detection Unit 32>

The QoS degradation detection unit 32 detects the flow whose QoS is degraded on the basis of the estimation result by the QoS estimation unit 31 to transmit a result to the control determination unit 33.

<Control Determination Unit 33>

When there is even one flow whose QoS is degraded, the control determination unit 33 determines control and its execution timing so that the total of QoS degradation times during control execution becomes minimum for all the sets of flows to transmit a determined control content to the transmission unit 13.

<Transmission Unit 13>

The transmission unit 13 instructs the controller/orchestrator of the virtual network to control on the basis of the control contents received from the control determination unit 33.

Calculation Method for Each Function

The QoS estimation unit 31 and the control determination unit 33 in the control system 100 calculate the QoS estimation value and the control for minimizing the QoS degradation time of each flow in accordance with the procedure described below.

First, the virtual network architecture in the problem setting to be handled by the present control system 100 is defined by using variables. This will be described with reference to "(1) Description of the problem setting of the virtual network". Next, in "(2) Description of the network control", the definition of the resource/routing control handled by the control determination unit 33 of the present control system 100 will be described. In addition, in "(3) E2E delay time calculation method", the E2E delay time used in the QoS estimation unit 31 and the control determination unit 33 will be described. Finally, the objective function used when the control determination unit 33 calculates the control and the constraint conditions thereof will be described with "(4) Description of the objective function of the control in the control determination unit" and "(5) Constraint conditions", respectively.

((1) Description of Problem Setting of Virtual Network)

Here, before describing the calculation methods in the QoS estimation unit 31 and the control determination unit 33, the problem setting and the definitions of variables used therefor will be described.

For a network, a set of servers is defined as N, a set of SF types is defined as F, and on each server n∈N, $SFI_{n,f}$ for providing SFf∈F operates. However, it is assumed that the number of SFIs providing the same SF is up to one at the maximum for each server. The server allocates resources for each SFI, and the traffic processing rate of the SFI is proportional to the allocated resource amount.

As examples of resources, there are a CPU, a memory, a storage, etc., but in this embodiment, only the CPU is considered, and one unit of resource is defined as one CPU core. The resource amount is given by an integer of 0 or more. It is assumed that servers in the network are geographically distributed, and, even when the same SF is processed, the server/SFI for processing a terminal's traffic might change depending on the cell in which the communication terminal is located.

Further, in the present embodiment, the traffic of the terminal is accommodated in the wireless base station and is not subject to the processing until the traffic is transferred to the core network, and only the processing in the core network using the SFC after the traffic of the terminal is transferred from the wireless base station to the core network is noted. However, such an assumption is an example, and the present invention can be applied to not only the processing in the core network but also the other cases.

It is assumed that traffic from each terminal flows from a transmission source in the core network to the nearest server, is processed by the SFI operating on the server in the network, and is transmitted to the server in the network nearest to the transmission destination. Each server is referred to as a transmission source server, a transmission destination server, and the like.

Next, for the services provided by the network, the set of services is defined as S. The service s e S is defined by the order $F_s = \{f^1{}_s, f^2{}_s, \ldots\}$ of the SF to be used and the QoS requirements. The time required from the arrival of traffic at the transmission source server until, after the SF processing is completed, arrival at the transmission destination server is considered as the QoS, and this time is called an E2E delay time. The E2E delay time determined by the QoS requirements of a service s is defined as $Q_s$. The definition expression of the service s is shown in Equation (1).

[Math. 1]

$$s := \{F_s, Q_s\}, \quad s \in \mathbb{S} \tag{1}$$

However, the SFs included in $F_s$ do not overlap. This is defined as shown in Expression (2).

[Math. 2]

$$\forall i, j \in \{1, \ldots, |F_s|, i \neq j\}, \quad f_s^i \neq f_s^j \tag{2}$$

Assume, for example, a network security service, a video distribution service, and the like, as concrete examples of services. In a security service, an SF corresponds to IDS, a load balancer, a firewall, and the like. In addition, the service to use, the transmission source/transmission destination servers of traffic, and so forth vary per communication terminal; accordingly, the terminals use varying servers/SFIs/links.

Then, the combination of the service and the transmission source/transmission destination servers is defined as a flow, and QoS is monitored and improved for each traffic belonging to the same flow. A set of flows is defined as K, a service used by the flow k∈K is defined as $s_k$, a transmission source server is defined as $n_k^{source}$, and a transmission destination server is defined as $n_k^{dest}$. The definition of the flow k is shown in Expression (3).

[Math. 3]

$$k := \{s_k, n_k^{source}, n_k^{dest}\}, \tag{3}$$
$$k \in \mathbb{K}, \quad s_k \in \mathbb{S}, \quad n_k^{source}, n_k^{dest} \in \mathbb{N}$$

For the observation information, the time point is divided into time steps t for each fixed time in the network, the traffic arrival rate to the $n_k^{source}$ at each time point t is measured for each flow k, and the current traffic arrival rate is estimated based on the measured traffic arrival rate. The estimated rate is defined as $\lambda(k,t)$. Based on the observation information, the network obtains routing control and resource control so as to minimize the degradation of QoS of each flow. These are collectively called network control. In this embodiment, new generation, deletion and resource allocation amount change of the SFI are called resource control, and change of the instance used by the flow and route change accompanying it are called routing control.

However, in the routing control, when all instances used by the flow are determined, the route of traffic between servers on which each instance operates is determined uniquely, and the route selection between servers is not performed. Note that the case in which route selection is not performed is simply an example, and the present invention is also applicable to the case where route selection is performed.

In addition, it is assumed that each control takes time from the execution of an instruction to the completion thereof, and this is called an execution time. The execution time is defined for each type of control, and the control result is not reflected until the instructed control is completed.

((2) Description of Network Control)

Next, the definitions of variables related to the resource/routing control, which are output from the control determination unit 33, will be described. First, with respect to routing control, an execution time is defined as $T_{rou}$, an instruction of control at a time point t is defined as $X_{n,f}(k,t)$, and a completed control result is expressed by $x_{n,f}(k,t+T_{rou})$. $T_{rou}$ is predefined. The relational expression (4) between $X_{n,f}(k,t)$ and $x_{n,f}(k,t+T_{rou})$ is shown.

[Math. 4]

$$x_{n,f}(k, t + T_{rou}) = X_{n,f}(k, t) \tag{4}$$

Expression (4) indicates that the results of the routing control $X_{n,f}(k,t)$ instructed at the time point t are reflected on the results $x_{n,f}(k,t+T_{rou})$ of the time point $t+T_{rou}$. $X_{n,f}(k,t)$ corresponds to routing control starting at the time point t. In control in which flow k uses $SFI_{n,f}$ sets, $X_{n,f}(k,t)=1$ holds; otherwise, $X_{n,f}(k,t)=0$ holds. In addition, when the routing control is not performed at the time point t, $X_{n,f}(k,t)=X_{n,f}(k,t-1)$ is set. When the routing control is completed, the SFI used by the flow k and the traffic route are changed. $x_{n,f}(k,t)$ represents the SFI used by the flow k as a result of the control completed at the time point t. When $SFI_{n,f}$ is used, $x_{n,f}(k,t)=1$ is satisfied, if not, $x_{n,f}(k,t)=0$ is satisfied.

Figure 2:
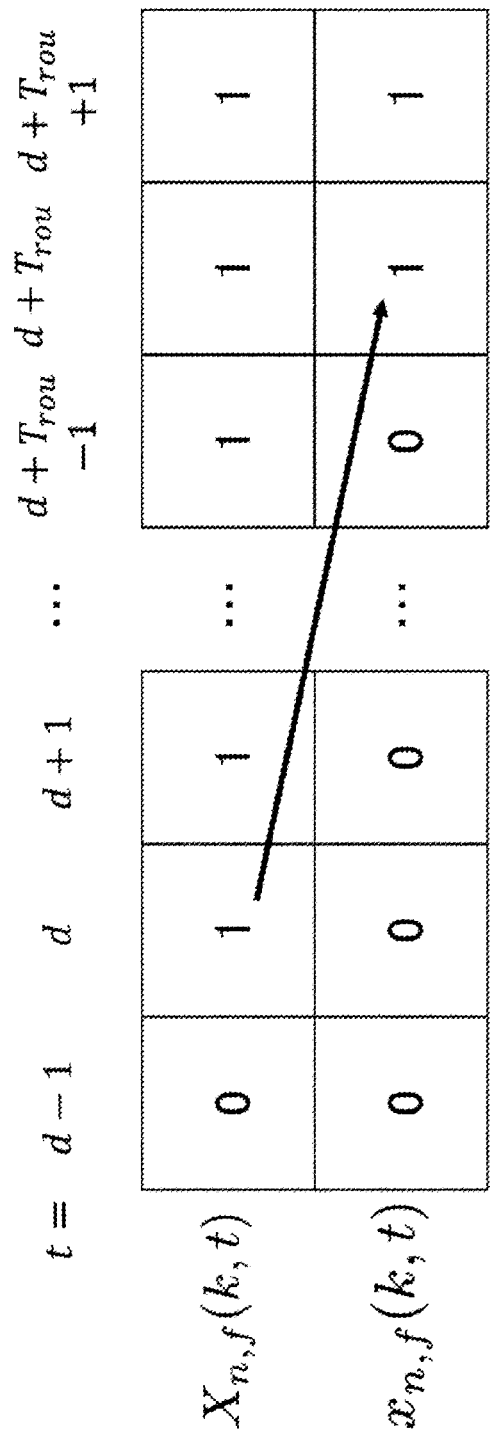
FIG. 2 is a diagram for explaining an example of routing control.

The correspondence between $x_{n,f}(k,t)$ and $X_{n,f}(k,t)$ is shown in FIG. 2. When $X_{n,f}(k,d-1)=0$ and $X_{n,f}(k,d)=1$ are satisfied, the control for making the flow k utilize the $SFI_{n,f}$ is started to be executed at the time point d. In addition, at this time, $x_{n,f}(k,d)$, $x_{n,f}(k,d+1)$, ..., $x_{n,f}(k,d+T_{rou})=0$ and $x_{n,f}(k,d+T_{rou})=1$ are satisfied, and from the time point $d+T_{rou}$, the flow k utilizes $SFI_{n,f}$. According to the change of the SFI to be used, the server to be used by the flow k is also changed. The server used by the flow k at the time point t and its order are defined as $N_{k,t}=\{n^1_{k,t}, n^2_{k,t}, \ldots, n^{|Fs\_k|}_{k,t}\}$. The suffix of the right shoulder of "$n^{|Fs\_k|}_{k,t}$" indicates the number of SF used by the flow k using the service s. The definition of $n^i_{k,t}$ is shown in Expression (5).

[Math. 5]

$$n^i_{k,t} = \left\{ n \,\middle|\, x_{n,f^i_{s_k}}(k, t) = 1, n \in \mathbb{N} \right\} \tag{5}$$

In the processing of $SFf^i_{s\_k}$ in flow k (here, the subscript s_k in "$f^i_{s\_k}$" is intended to be $s_k$), when the $SFI_{n,fisk}$ providing $f^i_{s\_k}$ on a server n is used ($x_{n,fisk}(k,t)=1$), the i-th server which flow k uses is the server n. Note that, for convenience of description of the text in the specification, when "$f^i_{s\_k}$" is used as a suffix, "$fisk$" is used such as "$SFI_{n,fisk}$" and "$x_{n,fisk}(k,t)$".

Next, for the resource control, the instruction of the control at the time point t is represented by $Z_{n,f}(t)$, and the control result completed at the time point t is represented by $z_{n,f}(t)$. $Z_{n,f}(t)$ corresponds to resource control starting at the time point t, and represents resource allocation amounts to $SFI_{n,f}$. When the resource control is completed, the resource amounts of $SFI_{n,f}$ are changed. $z_{n,f}(t)$ is defined as the resource amounts allocated to the $SFI_{n,f}$ as the result of the control completed at the time point t. However, when $z_{n,f}(t)=0$ is satisfied, it is assumed that $SFI_{n,f}$ is not present or deleted.

The execution time of the resource control is defined as $T_\alpha$ by using the type $\alpha$ of the control. $\alpha$ is defined in advance with assumption that the resource allocation increases (inc) or is reduced (red), and instances are newly generated (lau) and execution times are defined as $T_{inc}$, $T_{red}$, and $T_{lau}$, respectively. The type of control is determined based on the increase or decrease of $Z_{n,f}(t)$.

When $Z_{n,f}(t)$ is 0 at the previous time, and the new production of one or more SFI at the current time is satisfied with $Z_{n,f}(t)-Z_{n,f}(t-1)>0$ and $Z_{n,f}(t-1)=0$, the increase in resource allocation is performed in the case where $Z_{n,f}(t)-$ $Z_{n,f}(t-1)>0$ and $Z_{n,f}(t-1)>0$ are satisfied, and the reduction of resource allocation (including deletion of SFI) is performed in the case where $Z_{n,f}(t)-Z_{n,f}(t-1)<0$ is satisfied. This can be summarized as follows.

[Math. 6]

$$\delta_{n,f}(t) = Z_{n,f}(t) - Z_{n,f}(t-1) \qquad (6)$$

[Math. 7]

$$T_\alpha = \begin{cases} T_{inc} & \text{if } \delta_{n,f}(t) > 0, Z_{n,f}(t-1) > 0 \\ T_{red} & \text{if } \delta_{n,f}(t) < 0 \\ T_{lau} & \text{if } \delta_{n,f}(t) > 0, Z_{n,f}(t-1) = 0 \end{cases} \qquad (7)$$

The results of the resource control $Z_{n,f}(t)$ started to be executed at the time point t based on the $T_\alpha$ are reflected in the allocated resource amounts $z_{n,f}(t+T_\alpha)$ at the time point $t+T_\alpha$. This is represented by the following Expression (8).

[Math. 8]

$$z_{n,f}(t + T_\alpha) = Z_{n,f}(t) \quad (\alpha \in inc, red, lau) \qquad (8)$$

Figure 3:
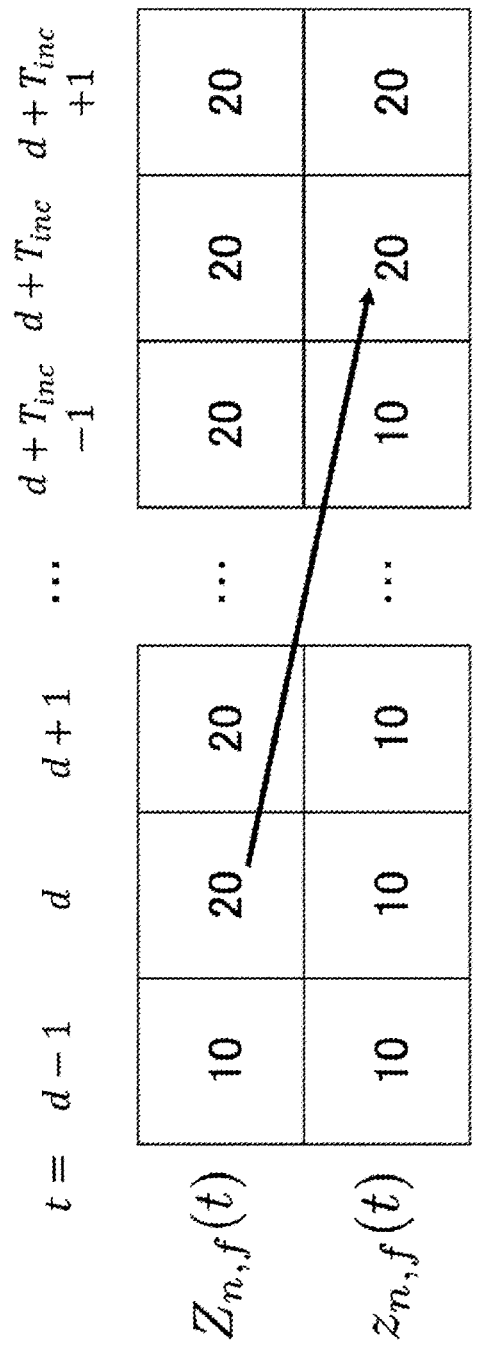
FIG. 3 is a diagram for explaining an example of resource control.

FIG. 3 shows the correspondence between $Z_{n,f}(t)$ and $z_{n,f}(t)$. In the example shown in FIG. 3, control for increasing the resource amount from 10 to 20 is executed at the time point d for the $SFI_{n,f}$. This control corresponds to the control for increasing the resource allocation ($Z_{n,f}(k,d)-X_{n,f}(k,d-1)>0$ and $Z_{n,f}(d-1)>0$), so that $T_\alpha=T_{inc}$ is established. Thus, $z_{n,f}(d)$, $z_{n,f}(d+1)$, ..., $z_{n,f}(d+T_{inc})=0$, $z_{n,f}(d+T_{inc})=1$ are satisfied, and the allocated resource of the $SFI_{n,f}$ becomes 20 from time point $d+T_{inc}$.

The traffic processing rate of the SFI changes with the change of the resource allocation amount of the SFI by the resource control. The processing rate of $SFI_{n,f}$ at the time point t is defined as $\mu_{n,f}(t)$. $\mu_{n,f}(t)$ depends on the resource allocation amount to the $SFI_{n,f}$ and the type of the SF, and as shown by the following Expression (9), is expressed by the product of the resource allocation amount $z_{n,f}(t)$ and the processing rate $p_f$ per one resource of the $SF_f$. $p_f$ is defined in advance for each $SF_f$.

[Math. 9]

$$\mu_{n,f}(t) = p_f z_{n,f}(t) \qquad (9)$$

Here, the variables and their meanings are summarized as Tables 1 to 3 below.

TABLE 1

| Variables | Meanings |
|---|---|
| $\mathbb{K}, k$ | Sets and elements of all flows |
| $\mathbb{K}_{n,n'}(t)$ | Set of flow using link (n → n') between servers n and n' at time point t |
| $\mathbb{N}, n$ | Sets and elements of all servers |
| $n_k^{source}$ | Transmission source server of traffic of flow k |
| $n_k^{dest}$ | Transmission destination server of traffic of flow k |
| $N_{k,t}, n_{k,t}^i$ | Order of server used by flow k at time point t and element thereof |
| $\mathbb{S}, s$ | Sets and elements of all services |
| $s_k$ | Service s corresponding to flow k |
| $\mathbb{F}, f$ | Sets and elements of all SFs |

TABLE 1-continued

| Variables | Meanings |
|---|---|
| $F_s, f_s^i$ | Vector indicating order of SF used by service s and element thereof |
| $C_n^{cpu}$ | Upper limit of total resource amount capable of allocating to SFI on server n |
| $C_{n,n'}^{band}$ | Upper limit of band of link (n → n') between servers n and n' |

TABLE 2

| Variables | Meanings |
|---|---|
| $D_k(t)$ | Estimation value of E2E delay time of flow k at time point t |
| $Q_s$ | Delay time of QoS requirements of flow k |
| $v_k(t)$ | Delay violation amount for QoS requirements of flow k at time point t |
| T | Parameter of objective function for time width when calculating violation amount of delay time |
| $D^l(n, n')$ | Transmission delay of link (n ↔ n') between servers n and n' |
| $D_{n,f}^p(t)$ | Processing delay of $SFI_{n,f}$ at time point t |
| $p_f$ | Traffic processing rate per resource of $SF_f$ |
| $\mu_{n,f}(t)$ | Traffic processing rate of $SFI_{n,f}$ at time point t |
| $\lambda(k, t)$ | Estimation value of traffic arrival rate of flow k at time point t |
| $x_{n,f}(k, t)$ | Whether or not $SFI_{n,f}$ is used for processing of $SF_f$ of flow k at time point t |
| $X_{n,f}(k, t)$ | Whether or not flow k uses $SFI_{n,f}$ after completions of controls which had started until time point t (determination variable) |

TABLE 3

| Variables | Meanings |
|---|---|
| $X_{n,f}^{rou}(k, t)$ | Whether or not control for use of $SFI_{n,f}$ of flow k is executed at time point t |
| $z_{n,f}(t)$ | Allocated resource amount for $SFI_{n,f}$ at time point t |
| $Z_{n,f}(t)$ | Allocated resource amount (determination variable) after completions of controls for $SFI_{n,f}$ at time point t |
| $Z_{n,f}^{inc}(t)$ | Whether or not control for increasing resource of $SFI_{n,f}$ is started at time point t |
| $z_{n,f}^{red}(t)$ | Whether or not control for reducing resource of $SFI_{n,f}$ is started at time point t |
| $z_{n,f}^{lau}(t)$ | Whether or not new generation of $SFI_{n,f}$ is started at time point t |
| $A_{n,f}(k, t)$ | Number of routing control being executed for $SFI_{n,f}$ at time point t |
| $B_{n,f}(t)$ | Number of routing control being executed for $SFI_{n,f}$ at time point t |
| $T_{inc}, T_{red}, T_{lau}$ | Execution time of control of resource increase, reduction, and SFI new generation |
| $T_{start}, T_{end}$ | Start time point and end time point of network operation period |

((3) Description of E2E Delay Time Calculation Method)

Next, a calculation method of the E2E delay time performed by the QoS estimation unit 31 and the control determination unit 33 will be described. The E2E delay time is the total of the processing delay of the SFI used by the flow k and the transmission delay between servers in which the SFI to be used is operated.

First, with respect to the processing delay, the packet processing of the SFI is modeled as an M/M/1 queue, and the average response time is defined as the processing delay. When the processing delay by the $SFI_{n,f}$ at the time point t is $DP_{n,f}(t)$, by using the traffic arrival rate $\lambda(k,t)$, the traffic processing rate $\mu_{n,f}(t)$, and $x_{n,f}(k,t)$ of the $SFI_{n,f}$. Expression (10) is defined.

[Math. 10]

$$D^p_{n,f}(t) = \frac{1}{\mu_{n,f}(t) - \sum_{k \in \mathbb{K}} \lambda(k,t) \, x_{n,f}(k,t)} \quad (10)$$

Next, with respect to the transmission delay, only the delay generated in the link between the servers is considered. The transmission delay between servers (n,n') is set to $D^l(n,n')$, and is defined in advance on a per-between-servers basis as a fixed value.

Then, by using the processing delay, the transmission delay, and $x_{n,f}(k,t)$, the E2E delay time $D_k(t)$ of the flow k is defined by Expression (11).

[Math. 11]

$$D_k(t) = \sum_{i=1}^{|N_{k,t}|-1} D^l\!\left(n^i_{k,t}, n^{i+1}_{k,t}\right) + \sum_{n \in \mathbb{N}} \sum_{f \in \mathbb{F}} x_{n,f}(k,t) D^p_{n,f}(t) \quad (11)$$

((4) Description of Objective Function of Control in Control Determination Unit 33)

In the present embodiment, it is considered that the amount of delay time (delay violation amount) for the QoS requirements is minimized for each flow k. The delay violation amount $v_k(t)$ of the flow k at the time point t is defined as follows. $v_k(t)$ is calculated by Expression (12) using the estimated E2E delay time $D_k(t)$ and the delay time $Q_{s_k}$ of the QoS requirements. A total $V(t)$ of the delay violation amounts $v_k(t)$ of each flow $k \in K$ in a certain time range T is defined as an objective function (13). Thus, since the total of delay violation amounts of all flows k over the time range T is used, control for minimizing the QoS degradation time in the time range from the present time to the future can be realized.

[Math. 12]

$$v_k(t) = \max\{0, D_k(t) - Q_{s_k}\} \quad (12)$$

[Math. 13]

$$V(t) = \sum_{d=0}^{T} \sum_{k \in K} v_k(t+d) \quad (13)$$

Note that the delay violation amount may be called the degradation amount. In addition, the use of delay as an indicator of QoS is simply an example. An index other than delay may be used as QoS. For example, the estimated throughput is compared with the required throughput, and when the estimated throughput is lower than the required throughput, the difference may be seen as the degradation amount.

((5) Description of Constraint Conditions)

Here, the constraint conditions for problem setting will be described. First, as for the constraint conditions related to the network resources, an upper limit $C^{cpu}_n$ exists in the resource amount of each server n, and the resource allocation amount to the SFI hosted to the same server does not exceed this. This constraint condition is expressed by the following Expression (14).

[Math. 14]

$$\sum_{f \in \mathbb{F}} z_{n,f}(t) \le C^{cpu}_n, \forall n \in \mathbb{N} \quad (14)$$

Similarly, there is an upper limit in the band of the link between the servers and the upper limit cannot be exceeded. For an interval of any server n and n', the traffic between the servers must be equal to or less than the upper limit $C^{band}_{n,n'}$ for each one direction. This restriction condition is expressed by the following Expression (16).

[Math. 15]

$$K_{n,n'}(t) = \left\{ k \mid n^{i-1}_{k,t} = n, n^i_{k,t} = n', 1 \le i \le |N_{k,t}| \right\} \quad (15)$$

[Math. 16]

$$\sum_{k \in K_{n,n'}} \lambda(k,t) < C^{band}_n, \forall n, n' \in \mathbb{N}, n \ne n' \quad (16)$$

The traffic processing capability (processing rate) of each SFI has the upper limit, and the traffic exceeding the processing rate is prevented from flowing. This constraint condition is expressed by Expression (17).

[Math. 17]

$$\sum_{k \in \mathbb{K}} \lambda(k,t) x_{n,f}(k,t) \le \mu_{n,f}(t), \forall n \in \mathbb{N}, \forall f \in \mathbb{F} \quad (17)$$

Next, the restriction conditions related to the network control will be described. With respect to the processing of the $SFf^i_{s\_k}$ of the flow $k \in K$, no additional control can be performed while changing (routing control) the SFI for its processing is in progress. This is defined by Expressions (18) to (20).

[Math. 18]

$$X^{rou}_{n,f}(k,t) = \begin{cases} 1, & \text{if } |X_{n,f}(t) - X_{n,f}(t-1)| = 1 \\ 0, & \text{otherwise} \end{cases} \quad (18)$$

[Math. 19]

$$A_{n,f}(k,t) = \sum_{d=0}^{T_{rou}-1} X^{rou}_{n,f}(k, t-d) \quad (19)$$

[Math. 20]

$$A_{n,f}(k,t) \le 1, \forall n \in \mathbb{N}, \forall f \in \mathbb{F}, \forall k \in \mathbb{K} \quad (20)$$

Here, $X^{rou}_{n,f}(k,t)$ is a variable representing whether or not the routing control is being executed. When $X^{rou}_{n,f}(k,t)=1$ holds, control for changing the SFI used in flow k to $SFI_{n,f}$ is in progress at the time point t. At this time, new routing control cannot be performed for the processing SFI of the SFf of the flow k. $A_{n,f}(k,t)$ is the number of controls being executed at the time point t with respect to the processing SFI of the SFf of the flow k, and this needs to be 0 or 1. Similarly, for the resource control of each $SFI_{n,f}$, further additional change cannot be performed during the allocation change. This is defined by Expressions (21) to (25)

[Math. 21]

$$Z_{n,f}^{inc}(t) = \begin{cases} 1, & \text{if } Z_{n,f}(t-1) > 0, \delta_{n,f}(t) > 0 \\ 0, & \text{otherwise} \end{cases} \quad (21)$$

[Math. 22]

$$Z_{n,f}^{red}(t) = \begin{cases} 1, & \text{if } \delta_{n,f}(t) \leq 0 \\ 0, & \text{otherwise} \end{cases} \quad (22)$$

[Math. 23]

$$Z_{n,f}^{lau}(t) = \begin{cases} 1, & \text{if } Z_{n,f}(t-1) = 0, \delta_{n,f}(t) > 0 \\ 0, & \text{otherwise} \end{cases} \quad (23)$$

[Math. 24]

$$B_{n,f}(t) = \sum_{d=0}^{T_{inc}-1} Z_{n,f}^{inc}(t-d) + \sum_{d=0}^{T_{red}-1} Z_{n,f}^{red}(t-d) + \sum_{d=0}^{T_{lau}-1} Z_{n,f}^{lau}(t-d) \quad (24)$$

[Math. 25]

$$B_{n,f}(t) \leq 1, \forall n \in \mathbb{N}, \forall f \in \mathbb{F} \quad (25)$$

Here, $Z^{\alpha}_{n,f}(t)$ is a variable representing whether or not each control $\alpha$ is being executed. For example, when $Z^{inc}_{n,f}(t)=1$ is satisfied, the control for resource augmentation for $SFI_{n,f}$ is in progress on the server n at the time point t. At this time, it is impossible to perform new control for $SFI_{n,f}$. $B_{n,f}(t)$ is the number of controls which are being executed at the time point t with respect to the $SFI_{n,f}$, and this needs to be 0 or 1.

In summary, the problem to be solved by the control determination unit 33 in the present embodiment is defined below.

[Math. 26]

$$\begin{aligned} &\text{minimize} && V(t) \\ &\text{subject to} && (14), (16), (17) \\ &&& (20), (25), T_{start} \leq t \leq T_{end} \end{aligned}$$

Here, $T_{start}$ and $T_{end}$ are the start time and the end time of the network operation period.

Operation of Control System 100

Figure 4:
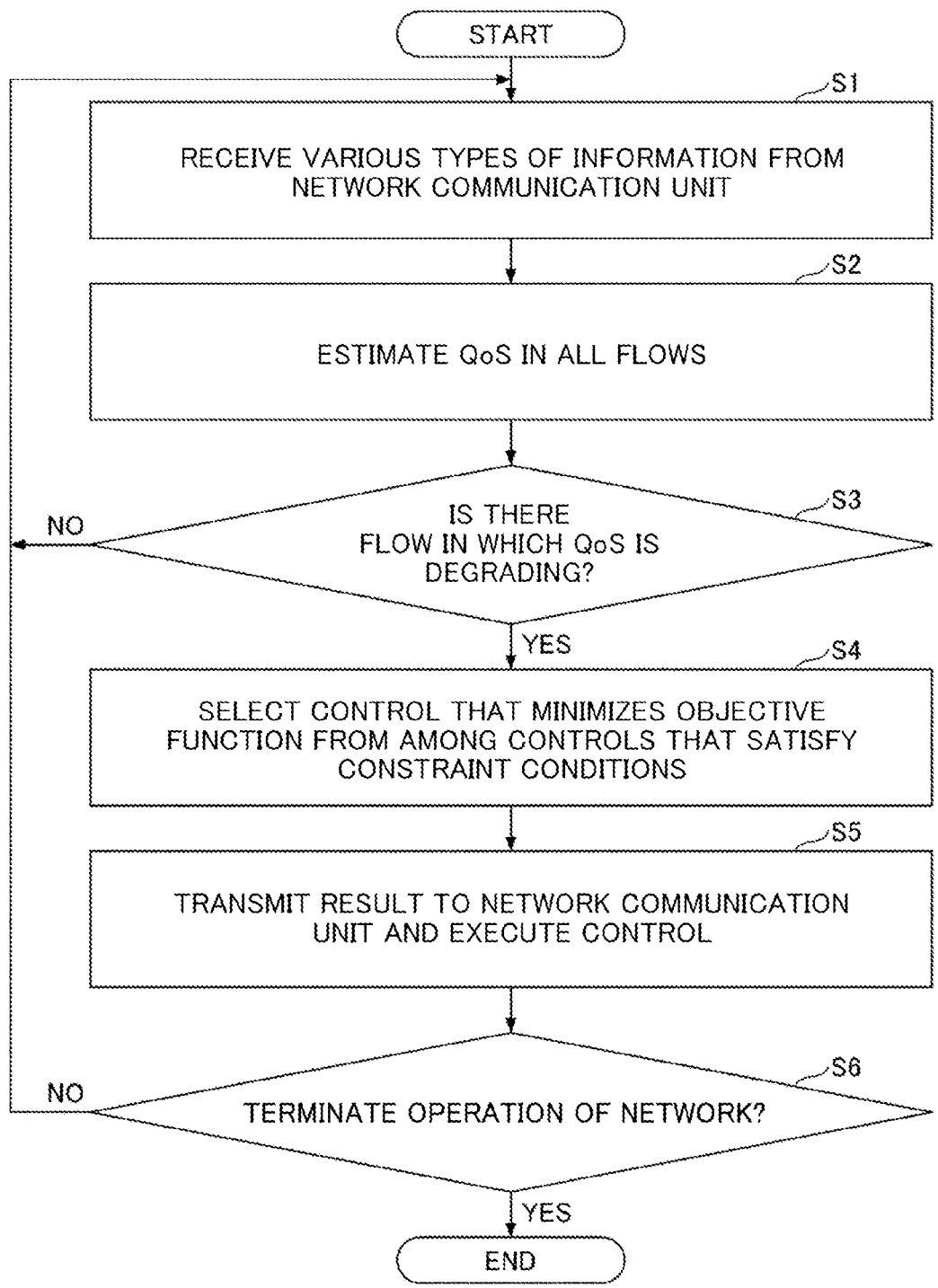
FIG. 4 is a flowchart for explaining an operation of the control system.

An operation of a control system 100 according to the present embodiment will be described with reference to the flowchart shown in FIG. 4.

As described above, the network communication unit 10 acquires information from the network control equipment. In S1, the input reception unit 20 periodically receives information from the network communication unit 10, and the data processing unit 30 periodically receives information from the input reception unit 20.

In S2, the QoS estimation unit 31 estimates the QoS at the current time of all flows on the basis of the received information. As described above, the QoS estimation unit 31 considers the E2E delay time as the QoS, and calculates the QoS based on the method described in "(3) Description of E2E delay time calculation method".

In S3, the QoS degradation detection unit 32 detects the QoS degradation of the flow based on an estimation result by the QoS estimation unit 31. The QoS degradation is determined by whether or not the processing time $D_k(t)$ of the flow k exceeds a threshold value $Q_{s\_k}$, and the flow exceeding the threshold value is determined to be having QoS degradation, and this flow is called a QoS degradation flow.

When the QoS degradation flow does not exist (No in S3), subsequent calculations are not performed, and the data processing unit 30 waits for information from the input reception unit 20. When the QoS degradation flow exists (Yes in S3), the processing proceeds to S4.

In S4, the control determination unit 33 calculates the control for minimizing the QoS degradation time of all flows including the QoS degradation flow. Specifically, the control determination unit 33 calculates the control for minimizing the objective function described in "(4) Description of objective function of control in control determination unit" with respect to the control described in "(2) Description of network control".

Determining control that minimizes the objective function corresponds to a combinatorial optimization problem. A method for solving this problem is not limited to the specific method, for example, a value of the objective function may be calculated for all combinations and a combination which minimizes the value can be adopted. Alternatively, the combination may be obtained by a heuristic method such as a genetic algorithm or a random search.

An example of the way of solving the problem in S4 will be described later in detail in "Example of calculation algorithm in the control determination unit 33".

In S5, the control determination unit 33 transmits information on the determined control to the network communication unit 10, and the transmission unit 13 of the network communication unit 10 executes the control to the network control equipment 40. After the transmission is completed, the series of control is terminated, and the data processing unit 30 waits for information from the input reception unit 20 again ("NO" in S6). When terminating the operation of the network ("YES" in S6), the operation of the control system is terminated.

Example of Calculation Algorithm in Control Determination Unit 33

Here, an example of an algorithm for calculating the resource/routing control in the control determination unit 33 is shown. First, the algorithm stochastically selects the control for routing control and resource control within a range satisfying the constraint conditions described in "(5) Description of constraint conditions", and combines the controls to obtain one solution. Next, the objective function value is calculated on the basis of Expression (13) for the obtained solution. Then, the operation up to this point is repeated a plurality of times, and a solution having the minimum objective function value is adopted as the control of this algorithm. Hereinafter, a method of selecting (1) routing control and (2) resource control will be described.

((1) Routing Control)

The routing control is intended to move a flow utilizing a high-load SFI to a lower-load SFI and to reduce the processing delay of each flow. Therefore, in this algorithm, the loads $l_{n,f}$ before control for the respective $SFI_{n,f}$ are defined by Expression (26). Based on this, "a flow to be moved to another SFI" and "an SFI of a movement destination" are selected stochastically, so that the control to distribute traffic loads can be obtained, and the purpose can be achieved. $l_{n,f}$ represents the magnitude of the arrival rate with respect to the traffic processing rate of the $SFI_{n,f}$, and corresponds to the denominator of Expression (10).

[Math. 27]

$$l_{n,f} = \sum_{k \in \mathbb{K}} \lambda(k, 0) \, x_{n,f}(k, 0) - \mu_{n,f}(0) \qquad (26)$$

A value shifted by adding $\min(l_{n,f})$ so that the minimum value of $l_{n,f}$ becomes 0 or more is defined as $l'_{n,f}$. However, when $\min(l_{n,f}) > 0$ is satisfied, $l'_{n,f} = l_{n,f}$ is established. A value normalized so that the total sum of $l'_{n,f}$ becomes 1 is defined as a weight $w_{n,f}$.

First, a flow $k_\alpha$ to be moved to another SFI is selected by using this $w_{n,f}$. Specifically, a certain SFI (referred to as $SFI_{n\_\alpha,f\_\alpha}$) is selected by the probability of $w_{n,f}$. Note that, for the convenience of description of the text in the specification, a suffix "$n_\alpha, f_\alpha$" is described as "$n\_\alpha, f\_\alpha$". The same applies to others. Then, the flow $k_\alpha$ is selected at random from a set of flows using $SFI_{n\_\alpha,f\_\alpha}$. Next, SFI (referred to as $SFI_{n\_\beta,f\_\beta}$) of the movement destination of flow $k_\alpha$ is selected. At this time, $SFI_{n\_\beta,f\_\beta}$ needs to provide the same SF as $SFI_{n\_\alpha,f\_\alpha}$ ($f_\alpha = f_\beta$). In the present algorithm, a weight $w^r_{n,f\_\alpha}$ is set so as to stochastically select SFI having a small load among SFI providing $SFf_\alpha$. Specifically, $1 - w_{n,f}$ is defined as a smallness of load, and a value normalized so that the total sum becomes 1 is defined as the $w^r_{n,f\_\alpha}$.

Then, $SFI_{n\_\beta,f\_\beta}$ is selected based on the probability of $w^r_{n,f\_\alpha}$. The execution timing of the control is selected at random within a range not competing with the execution time of the already selected control, and this is defined as $t_\alpha$.

The control selected by these operations is reflected on the determination variable $X_{n,f}(k,t)$ of this problem as shown by Expressions (27) and (28).

[Math. 28]

$$X_{n_\alpha, f_\alpha}(k_\alpha, t) = 0, \forall t \in [t_\alpha, T] \qquad (27)$$

[Math. 29]

$$X_{n_\beta, f_\beta}(k_\alpha, t) = 1, \forall t \in [t_\alpha, T] \qquad (28)$$

Expression (27) corresponds, for the flow $k_\alpha$, to the stop of use of $SFI_{n\_\alpha,f\_\alpha}$, and Expression (28) corresponds to the start of use of $SFI_{n\_\beta,f\_\beta}$. An upper limit is determined for the number of times of selecting the routing control, and the number of times of execution is determined randomly within the range.

((2) Resource Control)

The purpose of resource control is to enhance resources to a high-load SFI or to newly generate the SFI, and to reduce processing delay of each flow. In this algorithm, therefore, "SFI for enhancing/reducing resources" and "amount of enhancing/reducing resources" are stochastically selected based on the load $l_{n,f}$.

$SFI_{n\_\gamma,f\_\gamma}$ for enhancing resources is selected according to the probability of $w_{n,f}$ defined in "Routing control". Then, the resource enhancement amounts $\delta Z_{n\_\gamma,f\_\gamma}$ of $SFI_{n\_\gamma,f\_\gamma}$ are randomly determined within a range satisfying constraint conditions. In response to the resource enhancement, the resource amount allocated to other $SFI_{n,f}$ operating in the server $n_\gamma$ is reduced by total $\delta Z_{n\_\gamma, f\_\gamma}$.

As to the method of calculating the amount of resources to reduce, $\delta Z_{n\_\gamma,f}$ for each SFI, first, a weight $w^r_{n\_\gamma,f}$ which takes larger values as the load becomes smaller, is calculated for each $SFI_{n,f}$ in server $n_\gamma$ following the same procedures as $w^r_{n,f\_\alpha}$. Then, $\delta Z_{n\_\gamma,f}$ is determined based on $w^r_{n\_\gamma,f}$, so that the resource reduction amount of the SFI having a small load becomes stochastically large. An upper limit is determined for the number of times of selecting resource control, and the number of times of execution is determined randomly within the range.

The execution timing of the control is selected at random within a range not competing with the execution time of the already selected control, and this is defined as $t_\gamma$.

The control selected by these operations is reflected in the determination variables $Z_{n,f}(t)$ of the present problem as shown by Expressions (29) and (30).

[Math. 30]

$$Z_{n_\gamma, f_\gamma}(t) = Z_{n_\gamma, f_\gamma}(t-1) + \delta Z_{n_\gamma, f_\gamma}, \forall t \in \{t_\gamma, T\} \qquad (29)$$

[Math. 31]

$$Z_{n_\gamma, f}(t) = Z_{n_\gamma, f}(t-1) - \delta Z_{n_\gamma, f}, \forall f \in \mathbb{F}, \forall t \in \{t_\gamma, T\} \qquad (30)$$

Expression (29) corresponds to resource enhancement of $SFI_{n\_\gamma,f\_\gamma}$ and Expression (30) corresponds to resource reduction of other SFI in the server $n_\gamma$.

Example of Hardware Configuration

The control system 100 according to the present embodiment can be realized, for example, by causing a computer to execute a program. The computer may be a physical computer or a virtual machine on a cloud.

Specifically, the control system 100 can be realized by executing the program corresponding to the processing executed by the control system 100 using hardware resources such as a CPU and a memory that are built in the computer. The program can be recorded in a computer-readable recording medium (such as a portable memory) to be saved or distributed. It is also possible to provide the program through a network such as the Internet or email.

Figure 5:
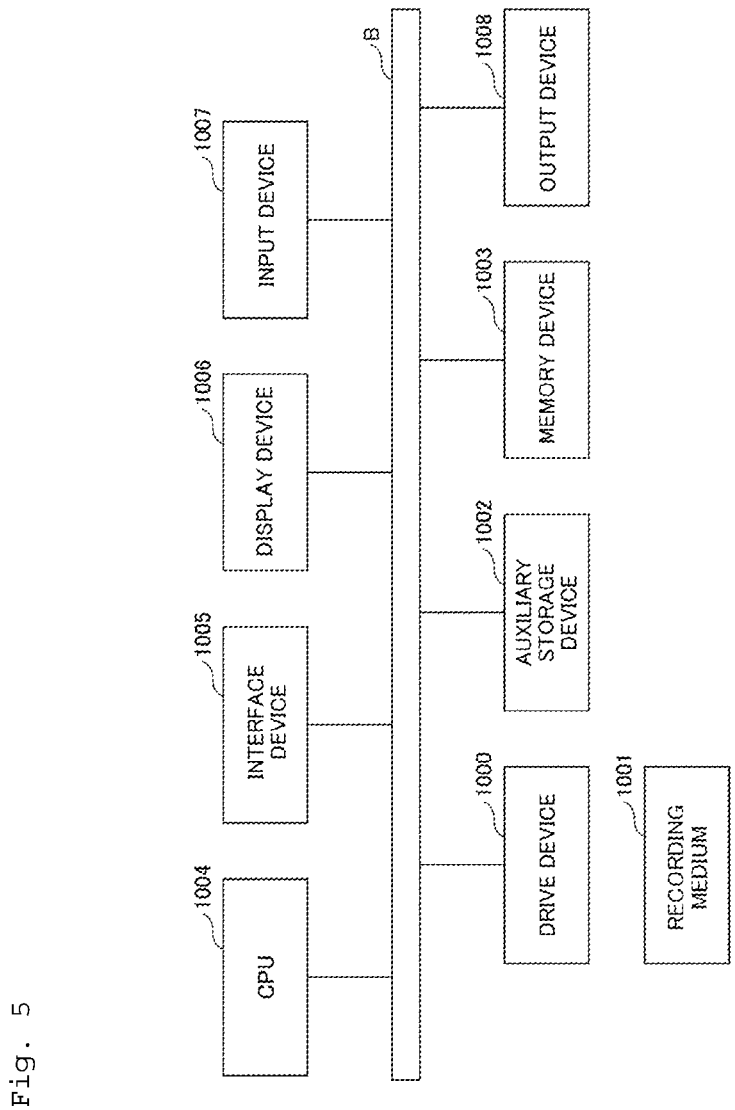
FIG. 5 is a diagram showing an example of a hardware configuration.

FIG. 5 is a diagram showing a hardware configuration example of the computer. The computer shown in FIG. 5 includes a drive device 1000, an auxiliary storage device 1002, a memory device 1003, a CPU 1004, an interface device 1005, a display device 1006, an input device 1007, and an output device 1008 which are connected to each other via a bus BS.

The program for realizing processing by the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. However, the program need not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores it when a program activation instruction is received. The CPU 1004 implements functions relating to the control system 100 in accordance with programs stored in the memory device 1003. The interface device 1005 is used as an interface for being connected to a network. The display device 1006 displays a graphical user interface (GUI) or the like by the program. The input device 1007 is constituted by a keyboard and a mouse, buttons, a touch panel, or the like and is used for inputting various operation instructions. The output device 1008 outputs a calculation result.

Summary of Embodiments, Effects

As described above, in the present embodiment, the QoS transition of each flow corresponding to the control content and the execution timing is estimated, the QoS degradation time in the time range from the present time to the future is modeled, the control objective function is defined as the sum of QoS degradation times of all flows, and control contents and their execution timing for minimizing the sum are determined.

By the above control operation, even when the executable timing and the execution time are different for each control, the effect of the QoS degradation improvement by the control can be evaluated based on the viewpoint of the QoS degradation time. In addition, even when QoS degradation of a plurality of flows occurs at the same time, the QoS degradation time can be minimized at the same time.

Supplementary Note

This specification discloses at least the control system, the virtual network control method, and the program of each of the following items.

(Item 1)

A control system for controlling a network providing a service by using a virtual network function, the control system including:
  a QoS estimation unit configured to estimate QoS at a current time of each flow in the network on a basis of observation information of the network;
  a QoS degradation detection unit configured to determine whether or not a QoS degradation flow is present on a basis of an estimation result by the QoS estimation unit; and
  a control determination unit configured to determine a control content and an execution timing thereof by solving an optimization problem with minimizing a total of degradation amounts in a time range from the current time to future for all flows as an objective function when the QoS degradation flow is determined to be present by the QoS degradation detection unit.

(Item 2)

The control system according to Item 1,
  wherein the QoS estimation unit estimates, as the QoS, a delay time that is a total of a processing delay in an instance of a virtual network function used by the flow and a transmission delay between servers on which the instance of the virtual network function to be used operates, for each flow.

(Item 3)

The control system according to Item 2,
  wherein the QoS degradation detection unit determines that a flow in which the delay time exceeds a threshold value is the QoS degradation flow.

(Item 4)

The control system according to any one of Items 1 to 3,
  wherein a degradation amount is calculated based on a control content for each control of resource control and routing control and a model based on execution time for each control content.

(Item 5)

A network control method executed by a control system that controls a network providing a service by using a virtual network function, the network control method including:
  a QoS estimation step of estimating QoS at a current time of each flow in the network on a basis of observation information of the network;
  a QoS degradation detection step of determining whether or not a QoS degradation flow is present on a basis of an estimation result of the QoS estimation step; and
  a control determination step of determining a control content and an execution timing thereof by solving an optimization problem with minimizing a total of degradation amounts in a time range from the current time to future for all flows as an objective function when the QoS degradation flow is determined to be present by the QoS degradation detection step.

(Item 6)

A program for causing a computer to function as each unit of the control system of any one of Items 1 to 4.

Although the present embodiment has been described above, the present invention is not limited to the specific embodiment, and various modifications and changes can be made within the scope of the gist of the present invention described in the claims.

REFERENCE SIGNS LIST

10 Network communication unit
11 Reception unit
12 Control execution time DB
13 Transmission unit
20 Input reception unit
30 Data processing unit
31 QoS estimation unit
32 QoS degradation detection unit
33 Resource/routing control determination unit
40 Network control equipment
100 Control system
1000 Drive device
1001 Recording medium
1002 Auxiliary storage device
1003 Memory device
1004 CPU
1005 Interface device
1006 Display device
1007 Input device

The invention claimed is:

1. A control system comprising a control determination unit configured to determine, when a flow in which quality of service is degrading is present, at least one of a control content and an execution timing thereof, based on amounts of quality-of-service degradation in all flows, wherein the amount of degradation is calculated based on respective control contents of resource control and routing control, and a model that is based on an execution time of each control content.

2. The control system according to claim 1, wherein the control determination unit determines the control content and the execution timing thereof by solving an optimization problem about the amounts of quality-of-service degradation in all flows in a predetermined period of time.

3. The control system according to claim 2, wherein, in the optimization problem, an objective function is set such that a total amount of quality-of-service degradation in all flows is minimized.

4. The control system according to claim 2, wherein the predetermined period of time is from a current time to a future time.

5. A control system for controlling a network that provides a service by using a virtual network function, the control system comprising:
  a quality-of-service estimation unit configured to estimate quality of service of each flow at a current time in the network, based on observation information of the network;
  a quality-of-service degradation detection unit configured to determine whether or not a flow in which the quality of service is degrading is present, based on a result of estimation by the quality-of-service estimation unit; and
  a control determination unit configured to determine a control content and an execution timing thereof by solving an optimization problem, in which an objective function is set such that a total amount of quality-of-service degradation in all flows in a time period from the current time to a future time is minimized, when the quality-of-service degradation detection unit determines that the flow in which the quality of service is degrading is present.

6. The control system according to claim 5, wherein the quality-of-service estimation unit estimates a delay time of each flow as the quality of service, the delay time being a total of a processing delay in an instance of a virtual network function that is used by each flow, and a transmission delay between servers on which the instance of the virtual network function used by each flow operates.

7. The control system according to claim 5, wherein the quality-of-service degradation detection unit determines that a flow in which the delay time exceeds a threshold value is the flow in which the quality of service is degrading.

8. The control system according to claim 5, wherein the amount of degradation is calculated based on respective control contents of resource control and routing control, and a model that is based on an execution time of each control content.

9. A network control method to be executed by a control system, the network control method comprising determining, when a flow in which quality of service is degrading is present, at least one of a control content and an execution timing thereof, based on amounts of quality-of-service degradation in all flows, wherein the amount of degradation is calculated based on respective control contents of resource control and routing control, and a model that is based on an execution time of each control content.

10. A non-transitory computer-readable recording medium storing a program that, when executed on a computer, causes the computer to function as each unit of the control system of claim 5.

* * * * *